(12) United States Patent
Joh (10) Patent No.: US 11,521,612 B2
(45) Date of Patent: Dec. 6, 2022

(54) VEHICLE CONTROL APPARATUS AND METHOD USING SPEECH RECOGNITION

(71) Applicants: HYUNDAI MOTOR COMPANY, Seoul (KR); KIA MOTORS CORPORATION, Seoul (KR)

(72) Inventor: Jae Min Joh, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 248 days.

(21) Appl. No.: 16/909,593

(22) Filed: Jun. 23, 2020

(65) Prior Publication Data
US 2021/0166683 A1 Jun. 3, 2021

(30) Foreign Application Priority Data

Nov. 28, 2019 (KR) .................. 10-2019-0155512

(51) Int. Cl.
*G10L 15/22* (2006.01)
*H04R 1/40* (2006.01)
(Continued)

(52) U.S. Cl.
CPC .............. *G10L 15/22* (2013.01); *B60N 2/002* (2013.01); *G01G 19/52* (2013.01); *G06V 40/172* (2022.01); *H04R 1/403* (2013.01); *H04R 1/406* (2013.01); *G06V 40/178* (2022.01); *H04R 2499/13* (2013.01)

(58) Field of Classification Search
CPC ......... G10L 15/22; G10L 15/04; G10L 15/18; G10L 15/20; G10L 15/063; G01G 19/52; G01G 19/414; G06F 3/167; G06F 3/165; G06F 3/16; G06V 40/172; G06V 40/16; G06V 40/17; G06V 40/178; H04R 1/403; H04R 1/406; H04R 1/40; H04R 2499/13; B60N 2/00; B60N 2/002; B60W 40/08; B60W 40/10; B60W 50/08; B60R 11/02; B60R 11/0247; B60R 21/01516; B60R 21/01538; B60R 21/015; B60R 16/0373
USPC ........ 704/275, 270, 272, 273, 274; 706/905, 706/913; 381/86, 365, 71.4, 302, 389
See application file for complete search history.

(56) References Cited

U.S. PATENT DOCUMENTS

2016/0174010 A1* 6/2016 Mohammad ............. H04R 5/04
381/302
2017/0116986 A1* 4/2017 Weng ...................... G10L 15/22

FOREIGN PATENT DOCUMENTS

JP 2003259459 A * 9/2003 ......... G01C 21/3608

* cited by examiner

*Primary Examiner* — Leshui Zhang
(74) *Attorney, Agent, or Firm* — Lempia Summerfield Katz LLC (57) ABSTRACT

A vehicle control apparatus and method use speech recognition and include: a passenger recognizing device configured to recognize passengers including a first passenger and at least one second passenger in a vehicle; a voice recognizing device configured to receive and to recognize a voice utterance by the first passenger or the at least one second passenger and to output a speech recognition result based on the received voice utterance; and a processor configured to additionally query the at least one second passenger or the first passenger based on the speech recognition result of the voice utterance of the first passenger or the at least one second passenger, respectively, to provide each of the first passenger and the at least one second passenger with a customized service.

17 Claims, 5 Drawing Sheets

(51) Int. Cl.
*B60N 2/00* (2006.01)
*G01G 19/52* (2006.01)
*G06V 40/16* (2022.01)

VEHICLE CONTROL APPARATUS AND METHOD USING SPEECH RECOGNITION

CROSS-REFERENCE TO RELATED APPLICATION

This application claims the benefit of priority to Korean Patent Application No. 10-2019-0155512, filed in the Korean Intellectual Property Office on Nov. 28, 2019, the entire contents of which are incorporated herein by reference.

TECHNICAL FIELD

The present disclosure relates to a vehicle control apparatus and method using speech recognition.

BACKGROUND

With the development of speech recognition technology, speech recognition is being applied to vehicles to improve user convenience and driving concentration of the user. The speech recognition system in the vehicle recognizes a single voice query based on a driver utterance or speech, outputs a speech recognition result, and then performs a single action on the speech recognition result.

When there are two or more passengers in a vehicle, the conventional speech recognition system outputs the speech recognition result or performs an action (function) corresponding to the speech recognition result, based on the words uttered by one of the passengers.

In addition, when processing the speech recognition result and when a personal preference is set up, such as vehicle control, song search, or the like, the conventional speech recognition system may provide an incorrect service that passengers do not want.

SUMMARY

The present disclosure has been made to solve the above-mentioned problems occurring in the prior art while advantages achieved by the prior art are maintained intact.

An aspect of the present disclosure provides a vehicle control apparatus and a method using speech recognition that provides a customized service for each passenger by recognizing a single voice query and re-querying each passenger based on the recognized voice query to grasp the intent of each passenger.

The technical problems to be solved by the present disclosure are not limited to the aforementioned problems. Any other technical problems not mentioned herein should be clearly understood from the following description by those of ordinary skill in the art to which the present disclosure pertains.

According to an aspect of the present disclosure, a vehicle control apparatus includes a passenger recognizing device configured to recognize passengers that include a first passenger and at least one second passenger in a vehicle. The vehicle control apparatus includes a voice recognizing device configured to receive and to recognize a voice utterance by the first passenger or the at least one second passenger and to output a speech recognition result based on the received voice utterance. The vehicle control apparatus includes a processor configured to additionally query the at least one second passenger or the first passenger based on the speech recognition result of the received voice utterance of the first passenger or the at least one second passenger, respectively, to provide each of the first passenger and the at least one second passenger with a customized service.

The passenger recognizing device is configured to recognize a presence and a location of the passengers through a weight sensor installed for each seat.

The passenger recognizing device is configured to recognize a face of each of the first passenger and the at least one second passenger through a camera to estimate an age of each passenger and to determine whether the first passenger and the at least one second passenger are capable of using speech recognition, based on the estimated age of each passenger.

The voice recognizing device includes a plurality of microphones, each of which is positioned for each seat and is configured to receive a voice utterance of a passenger seated at each seat.

The vehicle control apparatus further includes a sound output device including a plurality of speakers, each of which is positioned for each seat and is configured to independently output an acoustic signal.

The processor activates a microphone and a speaker for each seat based on the result of determining whether the first passenger and the at least one second passenger are capable of using speech recognition.

The processor processes an action matched with the speech recognition result to provide a service to the first passenger and the at least one second passenger when the speech recognition result is included in a common service domain.

The processor determines whether the speech recognition result is included in a domain requiring an additional query, when the speech recognition result is not included in a common service domain.

The processor determines whether to proceed with an additional query for each of the passengers based on the location of each of the passengers, a voice input location, and an action control target state when the speech recognition result is included in the domain requiring the additional query.

The processor generates and outputs an additional query for each of the passengers to the sound output device. The processor recognizes a response for each of the passengers through the voice recognizing device to perform an action according to the response of each of the passengers, when the processor proceeds with the additional query for each of the passengers.

According to an aspect of the present disclosure, a vehicle controlling method includes: recognizing passengers including a first passenger and at least one second passenger in a vehicle; receiving and recognizing a voice utterance of the first passenger or the at least one second passenger; outputting a speech recognition result based on the received voice utterance; and additionally querying the at least one second passenger or the first passenger based on the speech recognition result of the voice utterance of the first passenger or the at least one second passenger, respectively, to provide each of the first passenger and the at least one second passenger with a customized service.

The recognizing of the first passenger and the at least one second passenger includes recognizing a presence and a location of the passengers through a weight sensor installed for each seat.

The recognizing of the first passenger and the at least one second passenger includes: recognizing a face of each of the first passenger and the at least one second passenger through a camera to estimate an age of each passenger and determining whether the first passenger and the at least one second passenger are capable of using speech recognition based on the estimated age of each passenger.

The recognizing of the voice of the first passenger and the at least one second passenger includes activating or deactivating a microphone and a speaker, which are mounted for each seat, based on the result of determining whether the first passenger and the at least one second passenger are capable of using speech recognition.

The querying of the at least one second passenger or the first passenger includes: receiving the speech recognition result of the voice utterance of the first passenger or the at least one second passenger; determining whether the speech recognition result is included in a common service domain; and processing an action matched with the speech recognition result to provide a service to the first passenger and the at least one second passenger, when the speech recognition result is included in the common service domain.

The querying of the at least one second passenger or the first passenger includes: determining whether the speech recognition result is included in a domain requiring an additional query, when the speech recognition result is not included in a common service domain; determining to proceed with an additional query for each of the passengers when the speech recognition result is included in the domain requiring the additional query; generating an additional query for each of the passengers, when it is determined that the additional query for each of the passengers is required; recognizing a response of each of the passengers for the additional query; and performing an action according to the response of each of the passengers to provide a service matched with an intent of each of the passengers.

The determining to proceed with the additional query for each of the passengers includes determining to proceed with an additional query for each of the passengers based on the location each of the passengers, a voice input location, and an action control target state.

The vehicle controlling method further includes performing an action according to the speech recognition result of each of the passengers, when it is not determined that the additional query for each of the passengers is required.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Hereinafter, embodiments of the present disclosure are described in detail with reference to the accompanying drawings. In the drawings, the same reference numerals are used throughout to designate the same or equivalent elements. In addition, a detailed description of well-known features or functions has been ruled out in order not to unnecessarily obscure the gist of the present disclosure.

In describing elements of embodiments of the present disclosure, the terms first, second, A, B, (a), (b), and the like may be used herein. These terms are only used to distinguish one element from another element. Such terms do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It should be understood that terms used herein should be interpreted as having a meaning that is consistent with their meaning in the context of the present disclosure and the relevant art. Such terms should not be interpreted in an idealized or overly formal sense unless expressly so defined herein.

For the purpose of processing the individual speech recognition result in a vehicle where two or more passengers are present, the present disclosure relates to an apparatus and a method that recognize voices through a plurality of microphones and a plurality of speakers. The apparatus and the method then process the speech recognition result. In particular, the apparatus and the method process the speech recognition result by determining whether to process the appropriate result for another passenger other than a passenger uttering words or by additionally querying the other passenger to determine whether to process the result based on the response of the passenger.

Figure 1:
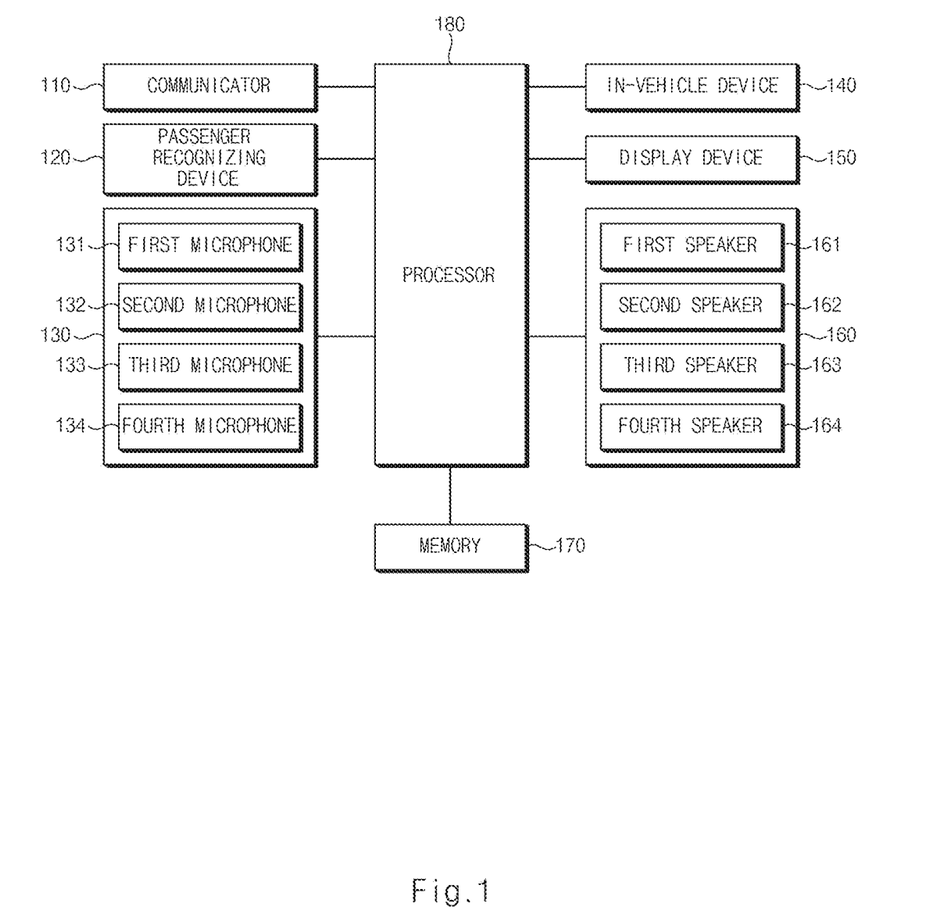
FIG. 1 is a block diagram illustrating a vehicle control apparatus, according to an embodiment of the present disclosure.
Figure 2:
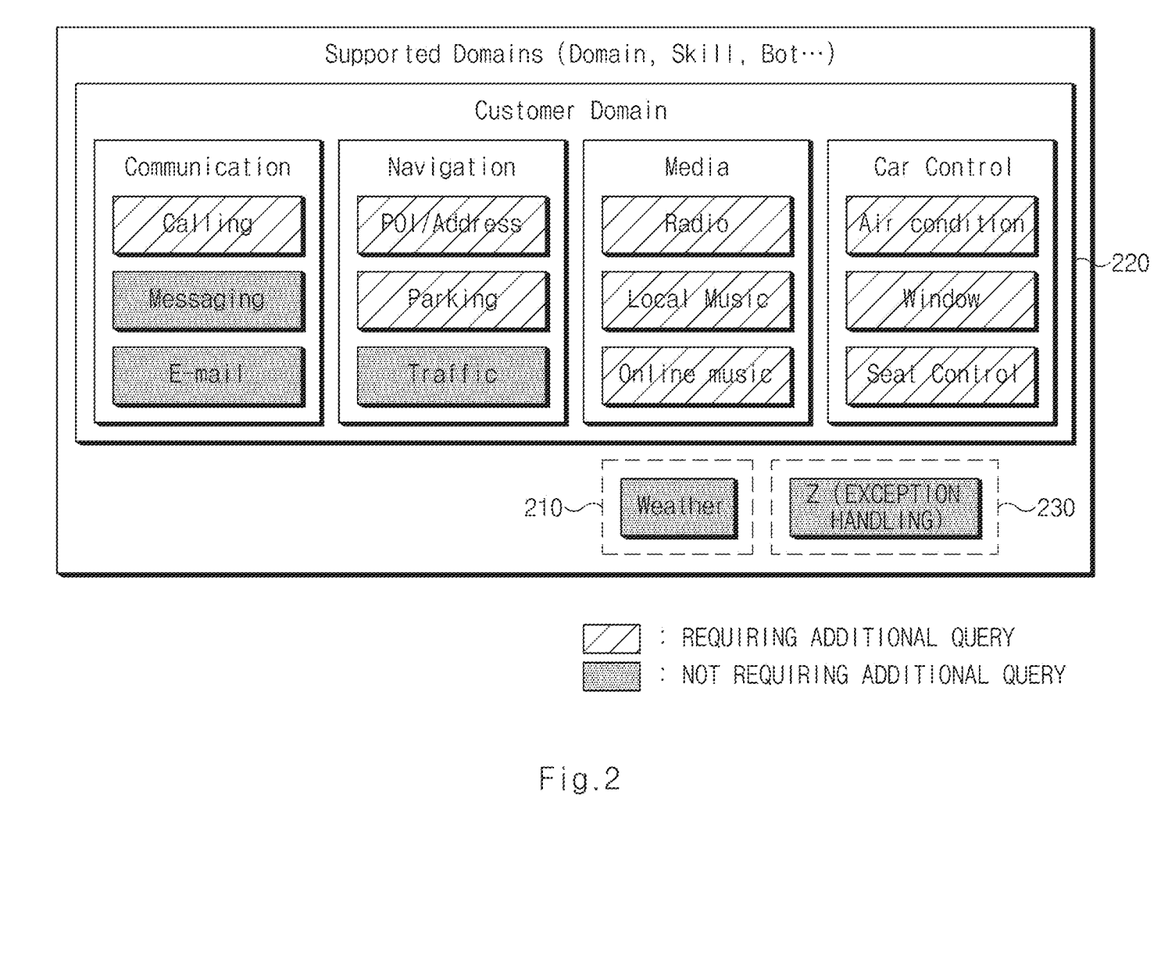
FIG. 2 is a diagram for describing a service domain associated with the present disclosure.

FIG. 1 is a block diagram illustrating a vehicle control apparatus according to an embodiment of the present disclosure. FIG. 2 is a diagram for describing a service domain associated with the present disclosure.

Referring to FIG. 1, a vehicle control apparatus includes a communicator 110, a passenger recognizing device 120, a voice recognizing device 130, an in-vehicle device 140, a display device 150, a sound output device 160, a memory 170, and a processor 180.

The communicator 110 may allow the vehicle control apparatus to communicate with devices positioned outside the vehicle, i.e., external devices (e.g., servers, roadside terminals, and/or other vehicles). In addition, the communicator 110 supports data transmission and reception between the processor 180 and the in-vehicle device 140. The communicator 110 may use at least one of communication technologies such as a wireless Internet technology, a short-range communication technology, a mobile communication technology, a Vehicle to Everything (V2X) technology, and the like. Wireless LAN (Wi-Fi), Wireless broadband (Wibro), and/or World Interoperability for Microwave Access (Wimax) may be used as the wireless Internet technology. Bluetooth, Near Field Communication (NFC), and/or Radio Frequency Identification (RFID) may be used as the short range communication technology. Code Division Multiple Access (CDMA), Global System for Mobile communication (GSM), Long Term Evolution (LTE), and/or International Mobile Telecommunication (IMT)-2020 may be used as the mobile communication technology. Vehicle to vehicle (V2V), vehicle to infrastructure (V2I), Vehicle-to-Nomadic Devices (V2N), and/or In-Vehicle Network (IVN) may be applied to the V2X technology. The IVN may be implemented with Controller Area Network (CAN), a Media Oriented Systems Transport (MOST) network, Local Interconnect Network (LIN), Ethernet, and/or X-by-Wire (Flexray).

The passenger recognizing device 120 recognizes passengers or occupants in a vehicle, i.e., a driver and a passenger or passengers, through sensors mounted in the vehicle. In other words, the passenger recognizing device 120 may recognize whether a passenger is present in the vehicle, the location of the passenger in the vehicle, and/or the passenger's age. The passenger recognizing device 120 may detect (recognize) the presence and the location of the passenger by using a weight sensor mounted in the vehicle for each seat, or the like. In addition, the passenger recognizing device 120 may estimate the passenger's age by recognizing the passenger's face through an image sensor positioned for each seat, i.e., a camera. In this case, the passenger recognizing device 120 may recognize the passenger's face in conjunction with a driver monitoring system (not illustrated).

The passenger recognizing device 120 determines whether each passenger is a user capable of utilizing a speech recognition function, i.e., a speech recognition user, based on whether a passenger is present in the vehicle, the location of the passenger, and/or the passenger's age. For example, when the passenger is an adult, the passenger recognizing device 120 determines that the passenger is a speech recognition user. When the passenger is an infant or a pet, the passenger recognizing device 120 determines that the passenger is a user incapable of utilizing the speech recognition function (i.e., a speech recognition non-user).

The passenger recognizing device 120 may include a memory, i.e., a non-transitory computer-readable medium (not illustrated) configured to store a face recognition algorithm, a passenger recognition (determination) algorithm, computer-executable instructions, and the like. The passenger recognizing device 120 may include a processor (not illustrated) configured to execute the algorithm and/or the computer-executable instructions stored in the memory. In an embodiment, the passenger recognizing device 120 is implemented separately from the processor 180 but is not limited thereto. The passenger recognizing device 120 may be implemented in the form coupled to the processor 180.

The voice recognizing device 130 recognizes a voice query uttered by, i.e., a voice utterance of, one (a speech recognition user or a talker) of the occupants (e.g., a driver and/or a passenger) in the vehicle. In other words, when a single user among the speech recognition users utters a voice command, the voice recognizing device 130 recognizes the voice command. The voice recognizing device 130 obtains (collects) an acoustic signal generated in the vehicle through a plurality of microphones 131-134 installed in the vehicle for each seat. The voice recognizing device 130 extracts the passenger's voice included in the acoustic signal. In other words, the voice recognizing device 130 receives the voice signal uttered by each passenger through the first microphone 131, the second microphone 132, the third microphone 133, and the fourth microphone 134, which are installed at a Front Left (FL) seat (a driver seat), a Front Right (FR) seat, a Rear Left (RL) seat, and a Rear Right (RR) seat, respectively. In this embodiment, the microphone is a sound sensor that receives an external acoustic signal and then converts the external acoustic signal into an electrical signal. Various noise removal algorithms for removing the noise input together with the acoustic signal may be implemented in the microphone. In other words, the microphone may remove the noise, which is generated while a vehicle is driving or which is input from the outside, from the acoustic signal input from the outside to output the noise-free acoustic signal. In an embodiment, four microphones are installed but the number of microphones is not limited thereto. The number of installed microphones may be changed depending on the number of seats in a vehicle.

The voice recognizing device 130 converts a voice signal input through at least one of the first to fourth microphones 131-134 into a text (text data), using a speech-to-text (STT) scheme. The voice recognizing device 130 analyzes the meaning (a talker's intent) of the converted text, using the Natural Language Understanding (NLU) algorithm to output the speech recognition result. The speech recognition results include a control command, a service domain, and the like that are matched with a voice query (a voice command).

The voice recognizing device 130 may detect the location of a talker, i.e., a location (a voice input location) where a voice signal is input. The voice recognizing device 130 recognizes the installation location of the microphone, which receives the voice input, as the voice input location. In this case, the voice recognizing device 130 determines the voice input location with reference to a lookup table in which the installation location for each microphone pre-stored in a memory (not illustrated) is defined.

The voice recognizing device 130 may perform speech recognition, using a variety of STT schemes and NLU schemes, which are publicly known in advance. The voice recognizing device 130 may include a memory, i.e., a non-transitory computer-readable medium, (not illustrated) configured to store a speech recognition algorithm, a voice database, computer-executable instructions and the like. The voice recognizing device 130 may include a processor configured to execute the speech recognition algorithm and/or the computer-executable instructions (not illustrated).

The in-vehicle device 140 includes at least one of a plurality of convenience devices installed in the vehicle such as an audio video navigation (AVN), a multimedia device, an air conditioning device, a window opening/closing device, a data transmission/reception device, and the like. The in-vehicle device 140 performs the predetermined action depending on the computer-executable instructions of the processor 180. For example, under the control of the processor 180, the in-vehicle device 140 may turn on an air conditioner, may activate the heating wire of a driver seat, or may close a window.

The display device 150 outputs the progress status and/or the speech recognition result according to the operation of the processor 180 as visual information. The display device 150 may include at least one of a liquid crystal display (LCD), a thin film transistor-liquid crystal display (TFT LCD), an organic light-emitting diode (OLED) display, a flexible display, a 3D display, a transparent display, a head-up display (HUD), a touch screen, and a cluster.

The sound output device 160 may be configured to output auditory information depending on the instructions of the processor 180. The sound output device 160 may include a plurality of speakers 161-164 installed for each seat in the vehicle. In other words, the sound output device 160 may output an audio signal (including a voice signal) through at least one of the first speaker 161, the second speaker 162, the third speaker 163, and the fourth speaker 164 that are installed in the FL seat, the FR seat, the RL seat, and the RR seat, respectively.

A memory 170, i.e., a non-transitory computer-readable medium, may store software programmed, i.e., computer-executable instructions, for the processor 180 to perform the predetermined operations. The memory 170 may temporarily store input data and/or output data of the processor 180. The memory 170 may be implemented with at least one of storage media (recording media), such as a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disc, web storage, and the like.

The memory 170 may store a lookup table in which a service domain capable of being serviced through voice control is defined. The service domain may include a common service domain 210, an individual service domain 220, and an exception handling domain 230. As illustrated in FIG. 2, among the common service domain 210, the individual service domain (a customer domain) 220, and the exception handling domain 230, the individual service domain 220 may include a domain necessary (requiring) an additional query and a domain that does not require an additional query. The common service domain 210 may include services such as weather, sports, news, stocks, Q&A, and the like. The individual service domain 220 may include services such as communication, telephones, point of interest (POI) search, radio, music (streaming), and vehicle control (air conditioning, windows, ventilated heating seats, or the like).

The processor 180 controls the overall operation of the vehicle control apparatus. The processor 180 may be implemented with at least one of an Application Specific Integrated Circuit (ASIC), a Digital Signal Processor (DSP), a Programmable Logic Devices (PLD), Field Programmable Gate Arrays (FPGAs), a Central Processing Unit (CPU), micro-controllers, and microprocessors.

When the ignition of a vehicle is turned on, the processor 180 may detect the presence of a passenger in the vehicle, the location of the passenger, and/or the passenger's age. At this time, the processor 180 recognizes the passenger (i.e., a speech recognition user) capable of using a speech recognition function, based on the presence of the passenger in the vehicle, the location of the passenger, and/or the passenger's age. In other words, the processor 180 distinguishes and recognizes the speech recognition user among the passengers in the vehicle. For example, the processor 180 recognizes a passenger other than an infant, a pet, or the like as a speech recognition user. The processor 180 recognizes an infant and/or a pet as a speech recognition non-user.

The processor 180 activates the corresponding microphones 131, 132, 133, and/or 134 and the corresponding speakers 161, 162, 163, and/or 164 that are positioned in a seat where the speech recognition user is seated. The seat is recognized via the voice recognizing device 130. The processor 180 deactivates the microphones 131, 132, 133, and/or 134 and the speaker 161, 162, 163, and/or 164 that are positioned in the seat where the speech recognition non-user is seated. For example, when the speech recognition users are positioned at the driver seat and the rear right (RR) seat, the processor 180 activates the first microphone 131, the fourth microphone 134, the first speaker 161, and the fourth speaker 164, which are mounted in the corresponding seat. In this example, the processor deactivates the remaining microphones 132 and 133 and the remaining speakers 162 and 163.

When the speech recognition result from the voice recognizing device 130 is received by the processor 180, the processor 180 determines whether the speech recognition result, i.e., the service domain of the recognized voice query, is included in the common service domain. When the speech recognition result is included in the common service domain, the processor 180 performs an action mapped to the speech recognition result. For example, when the processor 180 recognizes the voice query saying: "what's the weather today?" via the voice recognizing device 130, the processor 180 determines whether the voice query is included in the common service domain. When the voice query is included in the common service domain, the processor 180 obtains and outputs weather information from a weather center through the communicator 110. The processor 180 may convert the weather information into a voice signal to output the voice signal to the first to fourth speakers 161-164 or to the speaker positioned in a seat where the speech recognition user is seated.

When the speech recognition result is not included in the common service domain, the processor 180 determines that the speech recognition result is included in an individual service domain. Next, the processor 180 may determine which sub domain among sub domains of the individual service domain includes the speech recognition result. In other words, the processor 180 determines whether the speech recognition result includes a domain that requires an additional query or a domain that does not require an additional query.

When the speech recognition result is included in the domain requiring an additional query, the processor 180 determines whether to proceed with an additional query for each passenger. The processor 180 determines whether to proceed with an additional query for each passenger in consideration of the location of the passenger, the voice input location, the action control target state, and the like. For example, when a first passenger in a vehicle utters a voice query saying: "open a window", the processor 180 determines to proceed with an additional query for each passenger when a second passenger other than the first passenger being the talker is present and when all the windows of the seat where the second passenger is seated are closed. When the second passenger other than the first passenger being a talker is not present or when all the windows of the seat where the second passenger is seated are opened, the processor 180 determines not to proceed with an additional query for each passenger.

When the processor 180 determines to proceed with an additional query for each of the passengers, the processor 180 generates the additional query for each of the passengers. The processor 180 generates the additional query based on the speech recognition result recognized in advance. The processor 180 outputs the additional query generated using the TTS scheme, through the sound output device 160. The processor 180 recognizes the response of each of the passengers through the voice recognizing device 130. The processor 180 controls the in-vehicle device 140 depending on the response of each of the passengers to provide the service suitable for the needs of each of the passengers.

For example, when a driver utters: "Open a window", the voice recognizing device 130 converts the driver's voice into a text through the first microphone 131 and then analyzes the meaning of the converted text to recognize the voice query (voice command) of the driver. The voice recognizing device 130 outputs, as the speech recognition result, the voice query that says "open a window (Open-Window)" and the service domain "vehicle control" of the voice query. The processor 180 determines whether the voice query recognized based on the speech recognition result output from the voice recognizing device 130 belongs to the common service domain. When the recognized voice query is not included in the common service domain, the processor 180 determines whether the recognized voice query is included in a sub domain requiring an additional query in the individual service domain. When the recognized voice query is included in the domain requiring an additional query, the processor 180 determines whether to perform an additional query for each of the passengers. When a passenger in addition to a driver seats in a vehicle, the processor 180 may determine to proceed with an additional query for each passenger. When only the driver is seated in the vehicle, the processor 180 may determine not to proceed with an additional query for each of the passengers. When a passenger in addition to the driver is seated in the vehicle, the processor 180 generates an additional query saying: "do you want to open a window?" for each of the passengers. The processor 180 controls the window of a seat where the corresponding passenger is seated, depending on the passenger's response to the additional query. At this time, the processor 180 opens the window of the driver seat. When only the driver is seated in the vehicle, the processor 180 may immediately open the window of the driver seat, i.e., front left (FL) and then may generate an output voice guidance such as: "the window of the driver seat is open".

In another example, if passengers are seated in the front right (FR), RR, and rear left (RL) seats, when the voice input saying: "turn on the air conditioner", is generated from the FR seat, the processor 180 identifies the state of the air conditioner for a location of each of the passengers, for each voice input location, and for each seat. Table 1 below shows the state of the air conditioner for the location of each of the passengers, for each voice input location, and for each seat. In this embodiment, because the air conditioner at the RL seat is ON, the processor 180 outputs an additional query saying: "do you want to turn on the air conditioner?" through the speaker of the RR seat to ask the passenger at the RR seat. Afterward, when the processor 180 recognizes a response: "Yes" of the passenger at the RR seat, the processor 180 operates and turns ON air conditioners at the FR and RR seats.

TABLE 1

| Seat | Passenger | Voice input | Action control target state |
|---|---|---|---|
| FR | o | o | Air conditioner: OFF |
| FL | | | |
| RR | o | | Air conditioner: OFF |
| RL | o | | Air conditioner: ON |

When an additional query is not required, the processor 180 performs an operation according to the speech recognition result. For example, when the processor 180 recognizes the voice query saying: "turn on the air conditioner" in a state where another passenger other than a talker is not present, the processor 180 immediately controls an air conditioning system to operate the air conditioner. At this time, the processor 180 may additionally query the talker for the setting temperature of the air conditioner and may change the setting temperature of the air conditioner depending on the talker's response.

Figure 3:
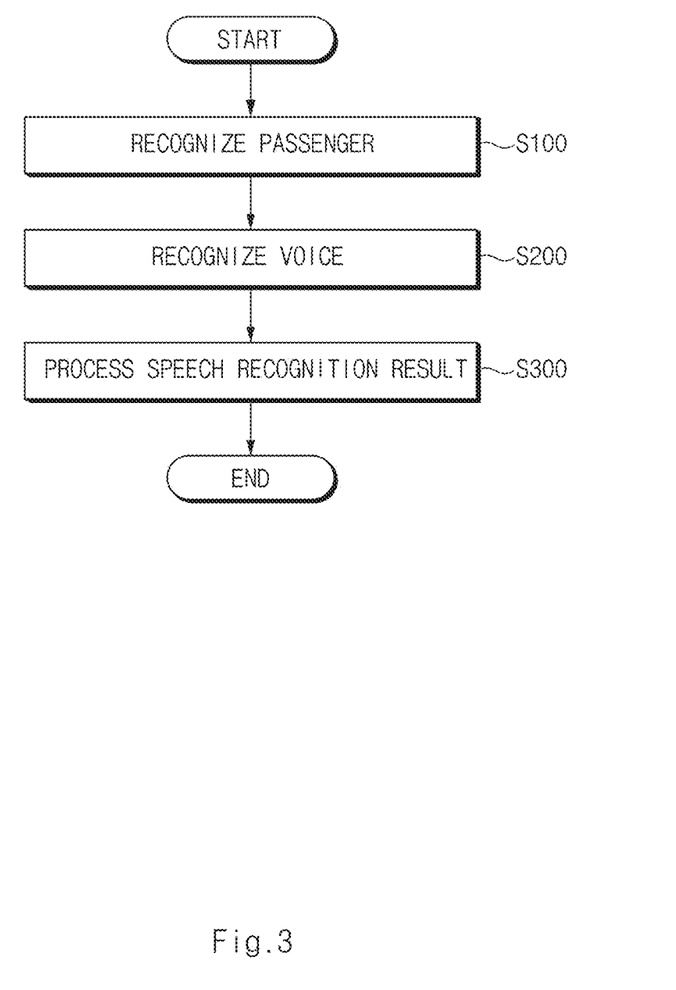
FIG. 3 is a flowchart illustrating a vehicle controlling method according to an embodiment of the present disclosure.
Figure 4:
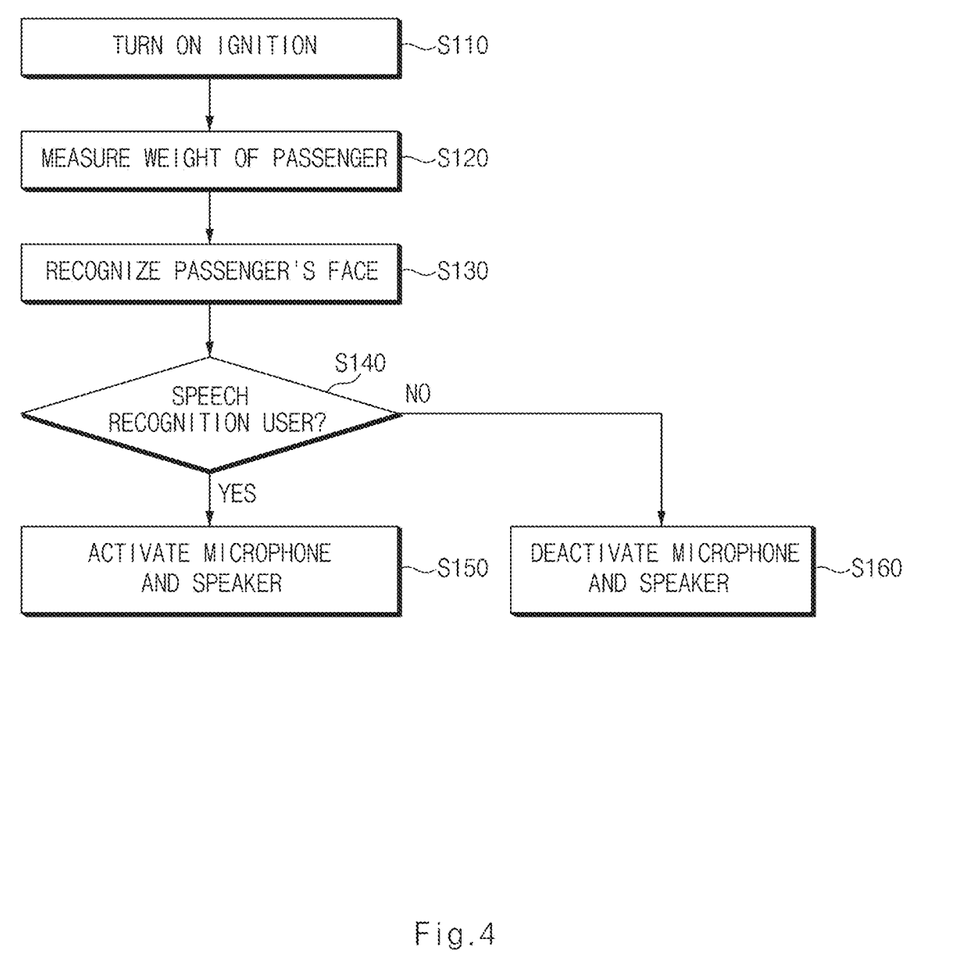
FIG. 4 is a flowchart illustrating a procedure of recognizing a passenger, as illustrated in FIG. 3.
Figure 5:
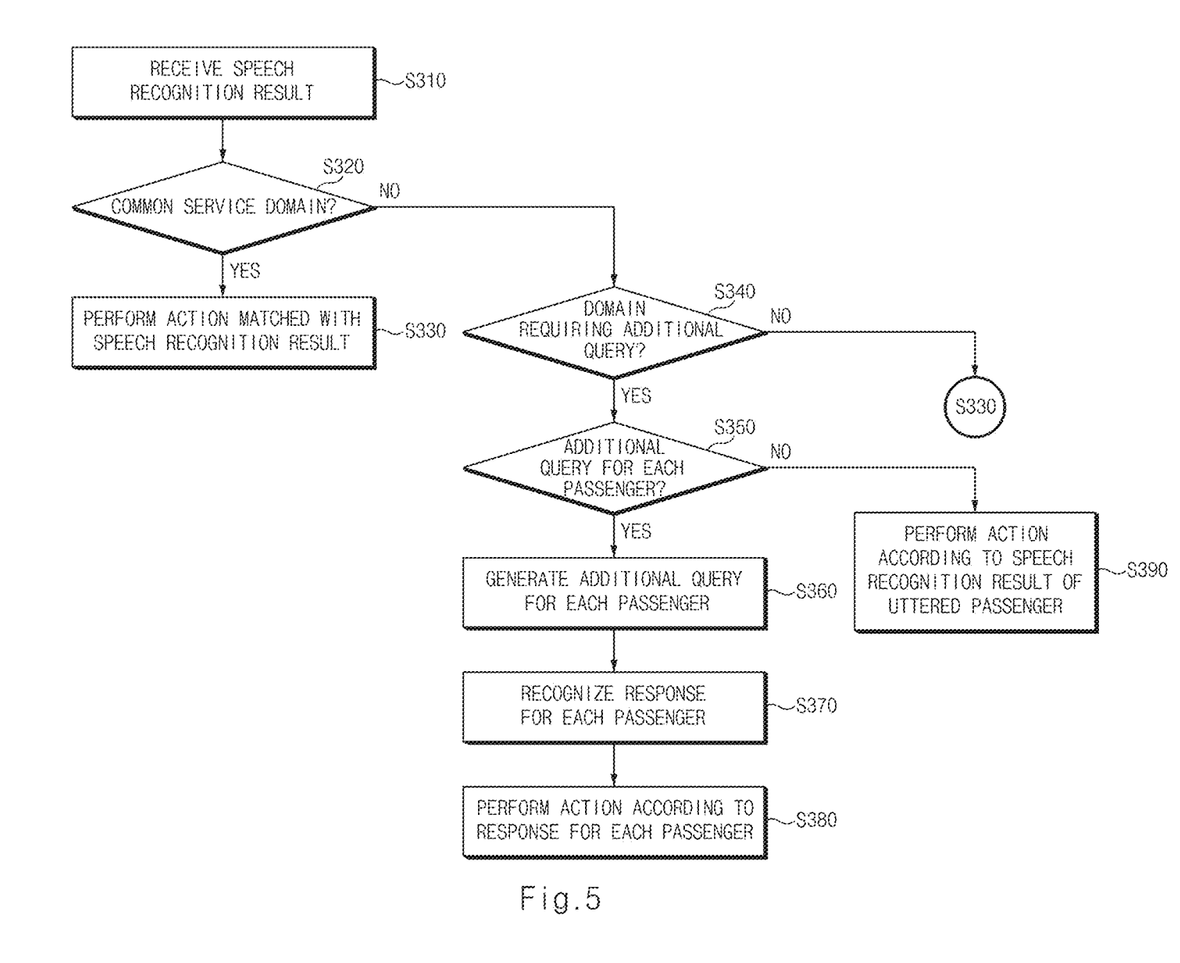
FIG. 5 is a flowchart illustrating a procedure of processing a speech recognition result, as illustrated in FIG. 3.

FIG. 3 is a flowchart illustrating a vehicle controlling method according to an embodiment of the present disclosure. FIG. 4 is a flowchart illustrating a procedure of recognizing a passenger, as illustrated in FIG. 3. FIG. 5 is a flowchart illustrating a procedure of processing a speech recognition result, as illustrated in FIG. 3.

The processor 180 recognizes a passenger (a first passenger and at least one second passenger) in a vehicle via the passenger recognizing device 120 (S100). The passenger recognizing device 120 may recognize whether the passenger is present in the vehicle, the location of the passenger, and/or the passenger's age via sensors mounted in the vehicle.

In more detail, when the ignition of the vehicle is turned on (S110), the passenger recognizing device 120 measures the weight of a passenger through a weight sensor mounted for each seat (S120). In other words, when power is supplied to the vehicle, the passenger recognizing device 120 measures the weight of a passenger for each seat, using a weight sensor. In addition, the passenger recognizing device 120 recognizes the passenger's face for each seat through a camera (S130). The passenger recognizing device 120 detects (recognizes) whether a passenger is present in the vehicle, the location of the passenger, and the passenger's age based on passenger weight information and passenger face information for each seat. The processor 180 determines whether the passenger for each seat is a speech recognition user, based on whether the passenger is present in the vehicle, the location of the passenger, and the passenger's age (S140). When determining the age of each passenger, if the processor 180 determines that the passenger is not an infant or a pet, then the processor 180 determines that the passenger is a speech recognition user. Otherwise, if the processor 180 determines that the passenger is an infant or a pet, then the processor 180 determines that the passenger is a speech recognition non-user. The processor 180 activates the corresponding microphones 131, 132, 133, and/or 134 and the corresponding speakers 161, 162, 163 and/or 164, which are positioned at a seat where the speech recognition user is seated (S150). The processor 180 deactivates the microphones 131, 132, 133 and/or 134 and the speakers 161, 162, 163 and/or 164, which are positioned at a seat where a speech recognition non-user is seated (S160).

Afterward, the processor 180 recognizes the passenger's voice input through the voice recognizing device 130 (S200). The voice recognizing device 130 may recognize the voice of a passenger (hereinafter referred to as a first passenger), which is input through one of the microphones among the activated microphones 131, 132, 133, and/or 134. When the voice input of the first passenger (a driver or a passenger) is present, the voice recognizing device 130 converts the entered voice signal into a text and then analyzes the converted text to grasp the meaning (i.e., the intent of the first passenger). The voice recognizing device 130 outputs a speech recognition result of the voice query including a service domain, a control command (action), and the like, which is recognized through speech recognition, to the processor 180. For example, the voice recognizing device 130 recognizes the passenger's voice query saying: "open the window" and then outputs the domain: "vehicle control", the control command (intent): "OpenWindow", the control locations: "FL, FR, RL, and RR", and the like of the recognized voice query as the speech recognition result.

The processor 180 processes the action mapped to the speech recognition result (S300). The processor 180 processes (executes) a control command matched with the recognized voice query.

The processor 180 receives a speech recognition result from the voice recognizing device 130 (S310). The processor 180 receives the speech recognition result of the first passenger recognized by the voice recognizing device 130. The processor 180 determines whether the speech recognition result is included in a common service domain (S320). The processor 180 determines whether the service domain mapped to the voice query of the recognized first passenger belongs to the common service domain. When the speech recognition result is included in the common service domain, the processor 180 processes an action matched with the speech recognition result (S330).

When the speech recognition result is not included in the common service domain, the processor 180 determines whether the speech recognition result is included in a domain requiring an additional query (S340). The processor 180 determines whether or not the voice query of the first passenger is included in a domain requiring an additional query, with reference to the pre-stored lookup table.

When the speech recognition result is included in a domain that requires an additional query, the processor 180 determines whether to proceed with an additional query for each of the passengers (S350). The processor 180 determines whether to proceed with an additional query for each of the passengers, based on the location of each of the passengers, a voice input location, an action control target state, and the like.

When it is determined that the additional query for each of the passengers is required, the processor 180 generates the additional query for each of the passengers (S360). The processor 180 generates an additional query for grasping the intent of the second passenger, based on the voice query of the first passenger. In other words, the processor 180 generates an additional query for asking the intent of the second passenger, based on a control command matched with the voice query of the first passenger. The processor 180 converts an additional query generated for each second passenger into a voice signal and then outputs the voice signal to the speaker of the seat where the second passenger is seated.

The processor 180 recognizes a response for each of the passengers with respect to an additional query for each of the passengers (S370). The processor 180 recognizes the response of each of the passengers through the voice recognizing device 130.

The processor 180 provides the customized service for each of the passengers, depending on the response for each recognized passenger (S380).

In S340, when the speech recognition result is not included in a domain that requires an additional query, the processor 180 performs an action matched with the speech recognition result (S330). For example, when one of passengers enters a voice query saying: "open the trunk", the processor 180 recognizes the voice query. When the service domain of the recognized voice query is a domain that does not require an additional query, the processor 180 controls the in-vehicle device 140 to open the trunk.

In S350, when it is determined that the additional query for each of the passengers has not progressed, the processor 180 performs the action according to the speech recognition result of the voice utterance of the passenger (S390). In other words, the processor 180 provides a service to the first passenger depending on the speech recognition result of the first passenger.

Hereinafter, the case of controlling actions of air conditioning, heating, ventilation sheets, windows, or the like based on the location of a passenger is described.

In a first example, when a driver enters a voice command saying: "turn on the air conditioner", the processor 180 recognizes the voice input of the driver. The processor 180 outputs a voice guidance such as: "I will turn on the air conditioner" through the speaker of the driver seat while turning on the air conditioner. Furthermore, the processor 180 generates and outputs an additional query saying: "do you want to turn on the air conditioner?" through the speaker mounted in the seat where the passenger is seated. Afterward, when the passenger utters the response: "yes", the processor 180 recognizes the passenger's response and then turns on the air conditioner of the passenger seat depending on the recognized response of the passenger. At this time, the processor 180 may output voice guidance such as: "I will turn on the air conditioner" through the speaker of the passenger seat.

In a second example, when the driver utters: "open a window", the processor 180 recognizes the utterance through the voice recognizing device 130. When a passenger in addition to the driver is present, the processor 180 generates and outputs an additional query saying: "do you want to open the window?" for each passenger. When the passenger answers: "no", the processor opens only the window at the driver seat and keeps the window at the passenger's seat in a closed state. At this time, the processor 180 outputs a voice announcement such as: "the window at the driver seat is open" through the speaker of the driver seat.

In a third example, when the driver utters: "turn on the ventilation sheet", the processor 180 determines that there is a need for an additional query to control the ventilation sheet. Then, the processor 180 outputs the additional query saying: "at what stage do you want to set the ventilation sheet?" through the speaker of the driver seat. At this time, the processor 180 outputs a query saying: "do you want to turn on the ventilation sheet?" for grasping the intent of a passenger, through the speaker of a passenger seat. Afterward, if the driver utters: "stage 3" and the passenger utters: "No", the driver's utterance is entered through the microphone of the driver seat and the passenger's utterance is entered through the microphone of the corresponding passenger seat. In this embodiment, the processor 180 may turn on the ventilation sheet of the driver seat to stage 3 through the in-vehicle device 140. The processor 180 outputs a voice guidance such as: "the ventilation sheet at the driver seat is turned on to stage 3", through the speaker of the driver seat and the speaker of the passenger's seat.

In a fourth example, when a passenger utters "turn on the ventilation sheet", the processor 180 recognizes the passenger's voice entered through the microphone of the passenger's seat. When the speech recognition result is included in a domain requiring an additional query, the processor 180 generates an additional query such as: "at what stage do you want to set the ventilation sheet?" to output the additional query to the speaker of the passenger's seat. The processor 180 receives and recognizes the passenger's response through the microphone of the corresponding passenger seat and sets the stage of the ventilation sheet depending on the recognized response of the passenger. At this time, the processor 180 does not operate the ventilation sheet of the driver seat.

In a fifth example, when a passenger utters: "play an exciting song", the processor 180 outputs a voice guidance saying: "play music XXX" through the speaker of the passenger's seat and plays the corresponding music through a multimedia device.

In a sixth example, when a passenger utters: "go to Starbucks", the processor 180 outputs an additional query saying: "do you want to change the destination to Starbucks?" through the speaker of the driver seat when the destination of the speech recognition result of the passenger is not the same as the point currently set as the destination at the navigation device. The processor 180 changes the destination or maintains the predetermined destination, depending on the driver's response.

The case of changing the target of an action depending on the voice input location is described below.

When a driver utters: "open a window", the processor 180 opens the window positioned on the left side of the driver seat. When a passenger at the rear seat of the driver seat enters a voice command saying: "open a window", the processor 180 opens the window of the left side at the rear seat.

The embodiments of the present disclosure are not intended to limit the technical spirit of the present disclosure but are provided only for illustrative purposes. The scope of protection of the present disclosure should be construed by the attached claims. All equivalents thereof should be construed as being included within the scope of the present disclosure.

According to an embodiment of the present disclosure, it is possible to provide a customized service depending on the intent of each passenger by recognizing a single voice query uttered by one of the passengers in the vehicle and re-querying each passenger again based on the recognized voice query to grasp the intent of each passenger.

Hereinabove, although the present disclosure has been described with reference to various embodiments and the accompanying drawings, the present disclosure is not limited thereto. The embodiments of the present disclosure may be variously modified and altered by those skilled in the art to which the present disclosure pertains without departing from the spirit and scope of the present disclosure claimed in the following claims.

What is claimed is:

1. A vehicle control apparatus, the vehicle control apparatus comprising:
    a passenger recognizing device configured to recognize passengers including a first passenger and at least one second passenger in a vehicle;
    a voice recognizing device configured to receive and to recognize a voice utterance by the first passenger or the at least one second passenger and configured to output a speech recognition result based on the received voice utterance; and
    a processor configured to output an additional query to the at least one second passenger or the first passenger based on the speech recognition result of the voice utterance of the first passenger or the at least one second passenger, respectively, to provide each of the first passenger and the at least one second passenger with a customized service,
    wherein the processor is further configured to
        generate and output the additional query for asking an intent of each of the at least one second passenger based on a control command matched with the speech recognition result of the voice utterance of the first passenger,
        recognize a response of each of the at least one second passenger for the additional query through the voice recognizing device, and
        perform an action according to the response of each of the at least one second passenger to provide a service matched with the intent of each of the at least one second passenger.

2. The vehicle control apparatus of claim 1, wherein the passenger recognizing device is configured to recognize a presence and a location of the passengers through a weight sensor installed for each seat.

3. The vehicle control apparatus of claim 2, wherein the passenger recognizing device is configured to recognize a face of each of the first passenger and the at least one second passenger through a camera to estimate an age of each of the first passenger and the at least one second passenger and to determine whether the first passenger and the at least one second passenger are capable of using speech recognition, based on the estimated age of each passenger.

4. The vehicle control apparatus of claim 3, wherein the voice recognizing device includes a plurality of microphones, each of which is positioned for each seat and configured to receive a voice utterance of each passenger seated at each seat.

5. The vehicle control apparatus of claim 4, further comprising:
    a sound output device including a plurality of speakers, each of which is positioned for each seat and configured to independently output an acoustic signal.

6. The vehicle control apparatus of claim 5, wherein the processor activates a microphone and a speaker for each seat based on the result of determining whether the first passenger and the at least one second passenger are capable of using speech recognition.

7. The vehicle control apparatus of claim 1, wherein the processor processes an action matched with the speech recognition result to provide a service to the first passenger and the at least one second passenger when the speech recognition result is included in a common service domain.

8. The vehicle control apparatus of claim 1, wherein the processor determines whether the speech recognition result is included in a domain requiring the additional query, when the speech recognition result is not included in a common service domain.

9. The vehicle control apparatus of claim 8, wherein the processor determines whether to proceed with the additional query for each of the passengers, based on the location of each of the passengers, a voice input location, and an action control target state when the speech recognition result is included in the domain requiring the additional query.

10. A vehicle controlling method, the vehicle controlling method comprising:
    recognizing passengers including a first passenger and at least one second passenger in a vehicle;
    receiving and recognizing a voice utterance of the first passenger or the at least one second passenger;
    outputting a speech recognition result based on the received voice utterance; and
    additionally, outputting an additional query to the at least one second passenger or the first passenger based on the speech recognition result of the voice utterance of the first passenger or the at least one second passenger, respectively, to provide each of the first passenger and the at least one second passenger with a customized service,
    wherein the outputting of the additional query to the at least one second passenger or the first passenger includes
        generating and outputting the additional query for asking an intent of each of the at least one second passenger based on a control command matched with the speech recognition result of the voice utterance of the first passenger,
        recognizing a response of each of the at least one second passenger for the additional query, and
        performing an action according to the response of each of the at least one second passenger to provide a service matched with the intent of each of the at least one second passenger.

11. The vehicle controlling method of claim 10, wherein the recognizing of the first passenger and the at least one second passenger includes:
    recognizing a presence and a location of the passengers through a weight sensor installed for each seat.

12. The vehicle controlling method of claim 11, wherein the recognizing of the first passenger and the at least one second passenger includes:
- recognizing a face of each of the first passenger and the at least one second passenger through a camera to estimate an age of each of the first passenger and the at least one second passenger; and
- determining whether the first passenger and the at least one second passenger are capable of using speech recognition, based on the estimated age of each passenger.

13. The vehicle controlling method of claim 12, wherein the recognizing of the voice utterance of the first passenger or the at least one second passenger includes:
- activating or deactivating a microphone and a speaker, which are mounted for each seat, based on the result of determining whether the first passenger and the at least one second passenger are capable of using speech recognition.

14. The vehicle controlling method of claim 10, wherein the outputting of the additional query to the at least one second passenger or the first passenger includes:
- receiving the speech recognition result of the voice utterance of the first passenger or the at least one second passenger;
- determining whether the speech recognition result is included in a common service domain; and
- processing an action matched with the speech recognition result to provide a service to the first passenger and the at least one second passenger, when the speech recognition result is included in the common service domain.

15. The vehicle controlling method of claim 10, wherein the outputting of the additional query to the at least one second passenger or the first passenger includes:
- determining whether the speech recognition result is included in a domain requiring the additional query, when the speech recognition result is not included in a common service domain; and
- determining to proceed with the additional query for each of the passengers when the speech recognition result is included in the domain requiring the additional query.

16. The vehicle controlling method of claim 15, wherein the determining to proceed with the additional query for each of the passengers includes:
- determining to proceed with the additional query for each of the passengers based on the location of each of the passengers, a voice input location, and an action control target state.

17. The vehicle controlling method of claim 15, further comprising:
- performing an action according to the speech recognition result of each of the passengers, when it is not determined that the additional query for each of the passengers has progressed.

* * * * *